June 20, 1950     H. JAFFA ET AL     2,512,333
MATERIAL HANDLING APPARATUS

Filed Sept. 18, 1948     5 Sheets-Sheet 1

INVENTORS
HARRY JAFFA
WILLIAM JAFFA
BY G. H. Braddock
ATTORNEY

June 20, 1950   H. JAFFA ET AL   2,512,333
MATERIAL HANDLING APPARATUS
Filed Sept. 18, 1948   5 Sheets-Sheet 3

INVENTORS
HARRY JAFFA
WILLIAM JAFFA
BY G. H. Braddock
ATTORNEY

June 20, 1950 H. JAFFA ET AL 2,512,333
MATERIAL HANDLING APPARATUS
Filed Sept. 18, 1948 5 Sheets-Sheet 5

INVENTORS
HARRY JAFFA
WILLIAM JAFFA
BY G. H. Braddock
ATTORNEY

Patented June 20, 1950

2,512,333

UNITED STATES PATENT OFFICE 2,512,333

MATERIAL HANDLING APPARATUS

Harry Jaffa, Detroit, Mich., and William Jaffa, Minneapolis, Minn.

Application September 18, 1948, Serial No. 49,936

18 Claims. (Cl. 214—75)

This invention has relation to material handling apparatus of the type more especially useful for the purpose of transporting lumber, concrete, etc., commonly known as straddle carriers.

An object of the invention is to provide material handling apparatus of the kind mentioned which will be of satisfactory, practical, efficient, new and improved construction.

A further object is to provide a straddle carrier, so-called, wherein will be incorporated various desirable and improved features and characteristics novel both as individual entities of the carrier and in combination with each other.

And a further object is to provide material handling apparatus of structure as hereinafter set forth devised to be capable of transporting lumber, concrete, etc., in a novel and improved manner.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification.

Figure 1:
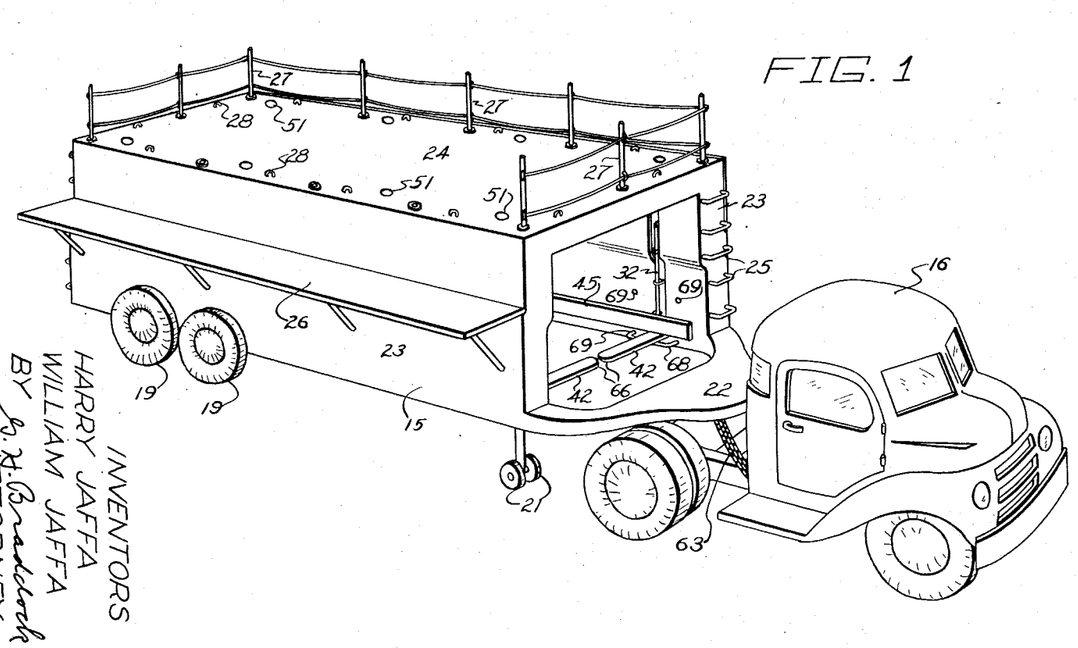
Fig. 1 is a perspective view of a material handling apparatus made according to the invention as when constituted as a trailer, the view also disclosing a truck with which the trailer is assembled.

In the disclosure as made, and referring to Fig. 1 of the drawings, the material handling apparatus is constituted as a trailer 15 detachably assembled with a truck 16. It is to be understood, however, that features and characteristics of the invention can be applied to use in connection with vehicles other than trailers. That is, material handling apparatus made according to the invention can be constituted as self-propelled vehicles in instances when considered desirable. A preferred form of the invention is disclosed in Figs. 1 to 5, inclusive.

The trailer 15 is constituted as a rectilinear body open at its lower portion save for spaced apart, parallel, longitudinally extending beams 17, 17 at the opposite sides of said trailer, and also open at its front and rear. Rearward portions of the longitudinally extending beams 17, 17 are, respectively, supported, as at 18, upon tandem wheels 19, 19, there being a set of tandem wheels at each of the opposite sides of the trailer, and forward portions of said longitudinally extending beams are, respectively, supported, as at 20, upon what are commonly termed dolly wheels 21, 21, there being a set of dolly wheels directly beneath each of the longitudinally extending beams. Said longitudinally extending beams can be supported upon the tandem and dolly wheels in any manner which may be considered suitable and convenient. A yoke piece 22, rigid with the forward ends of the longitudinally extending beams 17, 17, is for supporting the forward portions of said longitudinally extending beams upon the truck 16 in ordinary or preferred manner. The dolly wheels 21, 21 will be vertically adjustable, in a manner forming no part of the present invention, and will be lifted clear of the ground, as in Fig. 1 of the drawings, when the trailer is assembled with a truck. The dolly wheels can be adjusted downwardly, according to usual practice, to cause the yoke piece 22 to be elevated to above its position of assembly with a truck, and then adjusted upwardly, after the rear of the truck has been properly situated beneath said yoke piece, first to allow assembly of the yoke piece with the truck and eventually to lift said dolly wheels from the ground.

The trailer body includes spaced apart, parallel, upright side walls 23, 23, rigid with and extending vertically upwardly from the exterior edges of the longitudinally extending beams 17, 17, respectively, and a horizontally disposed roof or top wall 24, rigid with and spanning the distance between upper portions of said side walls 23, 23 in considerably spaced, parallel relation to said longitudinally extending beams. Stated otherwise, the longitudinally extending beams 17, 17 are disposed interiorly of lower portions of the spaced apart side walls 23, 23 and are situated beneath opposite side marginal portions of the roof or top wall 24.

The rear end of one of the side walls 23 supports spaced apart rungs 25, as does also the front end of the other side wall, by means of which workmen can readily position themselves upon the roof or top wall 24. Also, each of the spaced apart side walls supports a collapsible platform 26, disposed exteriorly of the trailer, for the convenience of workmen, and the roof or top wall 24 suitably and conveniently supports removable stanchions 27 and rope receiving eyes 28 which can be employed to anchor articles to be transported upon said roof or top wall.

Each of the longitudinally extending beams 17 supports a plurality, four as shown, of spaced apart, parallel, vertical lifting devices, each denoted 29. Each vertical lifting device 29 includes lower and upper, telescoping cylinders, represented 30 and 31, respectively, and a vertical elevating bar 32 parallel to said cylinders and mounted on said upper cylinder for rotative movement.

The lower cylinder 30 of each upright lifting device 29 has its closed lower end rigidly supported, as at 33, upon the upper surface of the corresponding longitudinally extending beam 17, and the upper cylinder 31 of each upright lifting device is telescoped upon and about the corresponding lower cylinder in fluid tight manner and for relative rotative movement of said upper and lower cylinders, as indicated at 34. The upper end of each upper cylinder 31 is closed, as denoted at 35, and the vertical elevating bar 32 of each vertical lifting device is supported upon the upper cylinder of the corresponding lifting device through the medium of upper and lower ears, designated 36 and 37, respectively, integral or rigid with the upper and lower ends, respectively, of said upper cylinder.

The vertical elevating bar 32 of each upright lifting device 29 is cylindrical, and the upper and lower ears 36 and 37 upon each upper cylinder 31 include annular openings which snugly, rotatably receive the corresponding vertical elevating bar. Collars, denoted 38 and 39, fixed upon the upper end portion of each vertical elevating bar 32 above and below and contiguous with the corresponding upper ear 36, preclude longitudinal movement and permit rotative movement of each vertical elevating bar within and relative to said corresponding upper ear, and collars, indicated 40 and 41, fixed upon an intermediate portion of each vertical elevating bar above and below and contiguous with the corresponding lower ear 37, preclude longitudinal movement and permit rotative movement of each vertical elevating bar within and relative to said corresponding lower ear 37. While the vertical elevating bars 32 are fixed relative to the upper cylinders 31 to be movable therewith as a unit, in a manner to be set forth, both when said upper cylinders are moved vertically and rotated, said vertical elevating bars are, at the same time, situated within the upper and lower ears 36 and 37 to be capable of having rotational movement within and relative to said upper and lower ears, as well as relative to the upper clylinders 31.

A lower end portion of each of the vertical elevating bars 32 is disposed below the lower ear 37 on the upper cylinder 31 of the corresponding vertical lifting device 29, at a side of the corresponding lower cylinder 30, and the lower end of each of said vertical lifting bars rigidly retains a horizontal supporting arm 42 situated at the side of the corresponding vertical lifting bar opposite the corresponding lower cylinder.

The lower end portion of each vertical elevating bar 32 rotatably supports an annular member 43 which rests upon the corresponding supporting arm 42 in such manner as to permit relative rotative movement of the annular member and the supporting arm, and collars 44, fixed on the vertical elevating bars above and in contiguous relation to the annular members 43, preclude, together with the supporting arms beneath the vertical elevating bars, movement of said annular members longitudinally of said vertical elevating bars.

Spaced apart, parallel guard rails at the opposite sides of the trailer 15 are designated 45, 45. Each of said guard rails 45 is rigidly supported by and disposed interiorly of the annular members 43 at the corresponding side of said trailer above and in adjacent relation to the supporting arms 42 at the same side of the trailer. The guard rails extend longitudinally of said trailer and are disposed in a single horizontal plane, and all of said supporting arms likewise lie in a single horizontal plane. The construction and arrangement are such that the vertical elevating bars 32 can be rotated within and relative to the annular members 43 to cause the supporting arms 42 to be rotated relative to said annular members and the guard rails while the annular members at each side of the trailer retain said guard rails so that they are disposed longitudinally of said trailer and in parallel relation to each other.

The upper cylinder 31 of each vertical lifting device 29 is disposed interiorly of and in adjacent relation to vertically spaced, horizontally disposed strengthening beams 46, 46 at the opposite sides of the trailer and extending longitudinally thereof, and the lower strengthening beam at each side of said trailer supports guide rollers 47, one for each upper cylinder 31, disposed interiorly of the upper cylinders, between said upper cylinders and the vertical elevating bars 32. Each guide roller 47 is made rigid with the strengthening beam by which supported through the medium of bracket members 48. In addition to the guide rollers, the lower strengthening beams support guide elements 49 for the upper cylinders 31 situated above and in alined relation to said guide rollers; and the upper strengthening beams support guide elements 50 situated above and in alined relation to said guide elements 49. And, too, the roof or top wall 24 of the trailer includes clearance openings 51 for passage of upper portions of the vertical lifting devices 29. See Fig. 5.

The lower strengthening beam 46 at each side of the trailer suitably and conveniently supports, as at 52, a horizontally disposed, longitudinally extending swinging device 53 including a cylinder 54 housing a piston 55. A connecting rod 56 of each swinging device 53 has one of its ends rigidly secured to the corresponding piston 55 and its other end rigidly secured to an actuator 57 slidably supported upon the corresponding strengthening beam 48 for movement longitudinally of the trailer. In turn, the actuator 57 is pivotally connected, as at 58, to a horizontally disposed actuator rod 59.

The vertical elevating bar 32 of each vertical lifting device 29 slidably supports an actuator collar 60 in such manner that while the vertical elevating bars are free for movement longitudinally in the actuator collars, said vertical elevating bars and actuator collars are fixed against relative rotative movement. Stated differently, each actuator collar 60 is splined, as at 61, to its corresponding vertical elevating bar 32 in such manner as to permit longitudinal movement of said vertical elevating bars relative to said actuator collars and to prevent relative rotative movement of the vertical elevating bars and the actuator collars.

The horizontal actuator rod 59 at each side of the trailer is pivotally connected, as at 62, to a portion of each of the actuator collars 60 at the corresponding side of said trailer disposed interiorly of the corresponding vertical elevating bar 32. That is, the horizontal actuator rods 59 are pivotally connected to portions of the actuator collars 60 situated at the sides of the vertical elevating bars 32 opposite the lower and upper cylinders 30 and 31.

The upper cylinders 31 are adapted to be elevated, moved in direction away from the lower cylinders 30, in response to pressure of fluid applied within the spaces confined by the upper and lower cylinders, and said upper cylinders are adapted to become depressed by gravity, due to their weight and the weight of the parts associated with them, upon relief of pressure of fluid in said spaces. Fluid under pressure applied to the interior of the upper and lower cylinders can be either gas, such as air, or liquid, such as oil. In the disclosed embodiment, the applied fluid will be air. That is to say, the vertical lifting devices 29 are pneumatically operated.

Flexible air hoses 63 lead from a source (not shown) of supply of air under pressure upon the truck 16 individually to each of the lower cylinders 30 and communicate with the interior space confined by each set of upper and lower cylinders through an inlet port 64 in the lower portion of each lower cylinder. Said flexible air hoses 63 pass through a so-called divider 65, between the source of supply of air under pressure and said lower cylinders, the function of which divider is to equalize the pressure applied to the different cylinders. Equalizers such as 65 are now of commerce.

The piston 55 of each of the horizontal swinging devices 53 is adapted to be moved to the left in response to pressure of fluid in the right end portion of the corresponding cylinder 54 and to the right in response to pressure of fluid in the left end portion of the corresponding cylinder 54. In the disclosure as made, the pressure fluid employed for actuating the pistons 55 is air, although the pressure fluid could be oil or other liquid. Flexible air hoses lead from the source of supply of air under pressure, by way of the divider 65, to each of the opposite end portions of each of the cylinders 54. The construction and arrangement will be such that air under pressure can be admitted simultaneously to the right end portions of the oppositely disposed cylinders 54 to cause the pistons 55 with connecting rods 56 to be concurrently moved to the left, and to the left end portions of said oppositely disposed cylinders to cause said pistons 55 with connecting rods 56 to be concurrently moved to the right. The divider 65 will cause pressure in equal amount to be applied against the different pistons 55.

Figure 2:
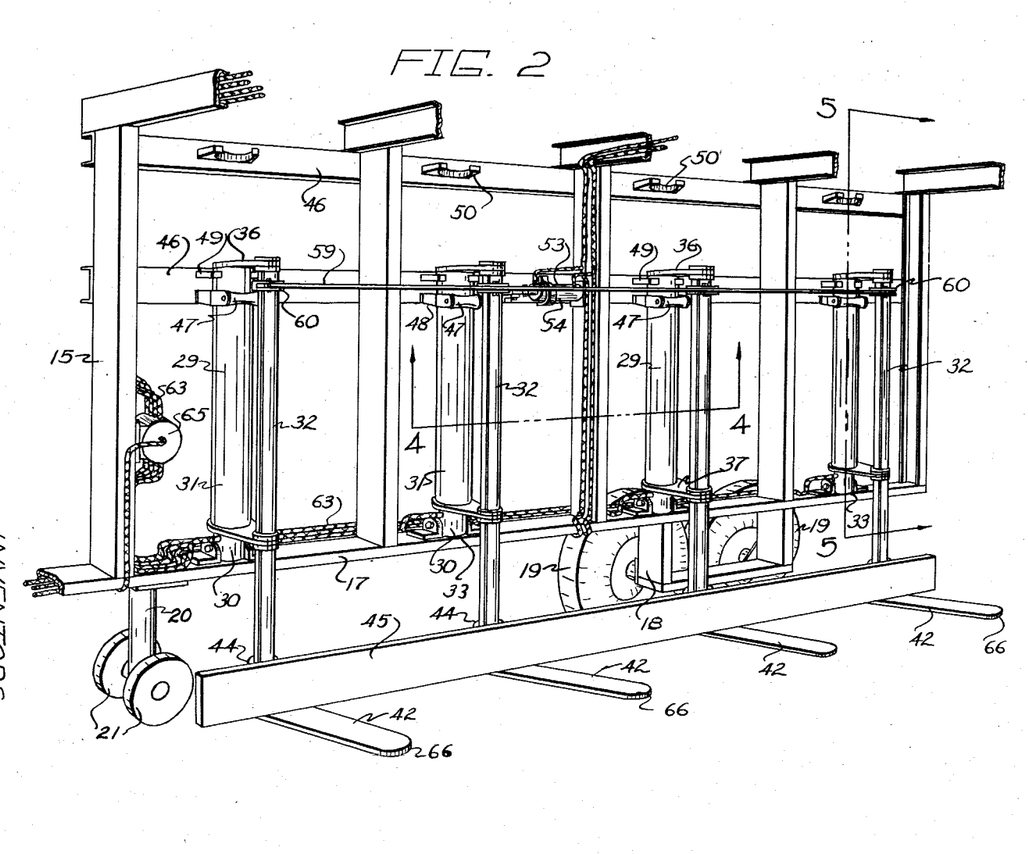
Fig. 2 is an enlarged fragmentary perspective view disclosing the left side portion of the trailer of Fig. 1 as it would appear from the right side in said Fig. 1, but with parts in different positions.
Figure 3:
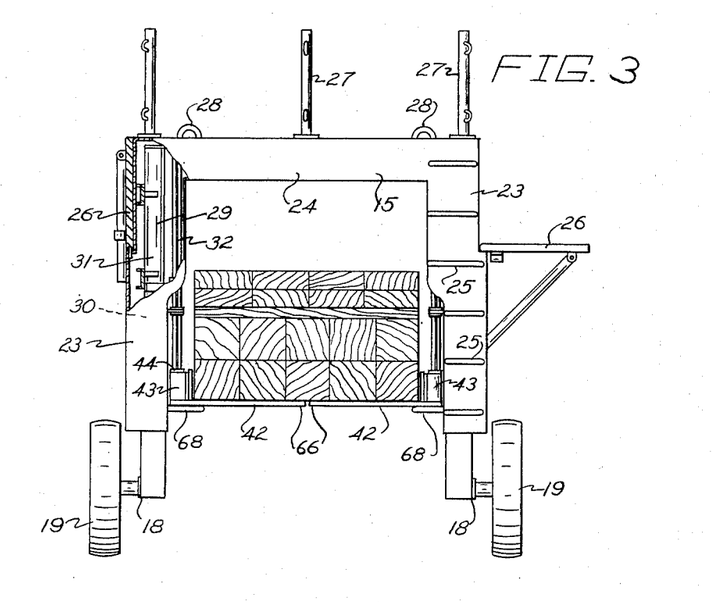
Fig. 3 is a rear view, partially in section and partially broken away, on a scale larger than Fig. 1 and smaller than Fig. 2, of the trailer of said Fig. 1 as when supporting a load.
Figure 4:
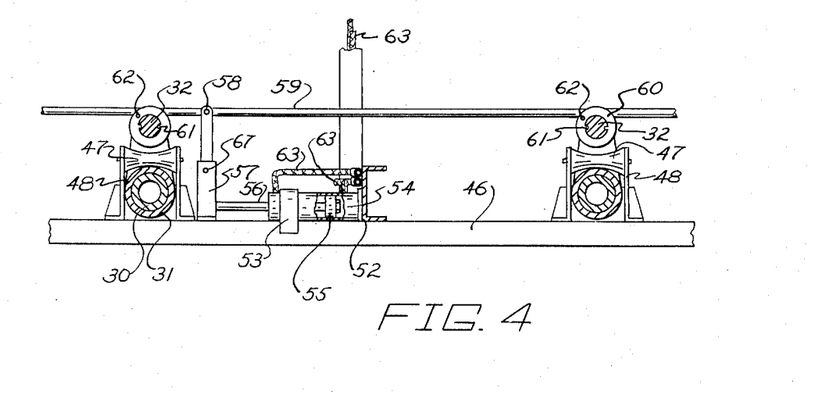
Fig. 4 is a detail sectional view, taken on line 4—4 in Fig. 2.
Figures 5, 9:
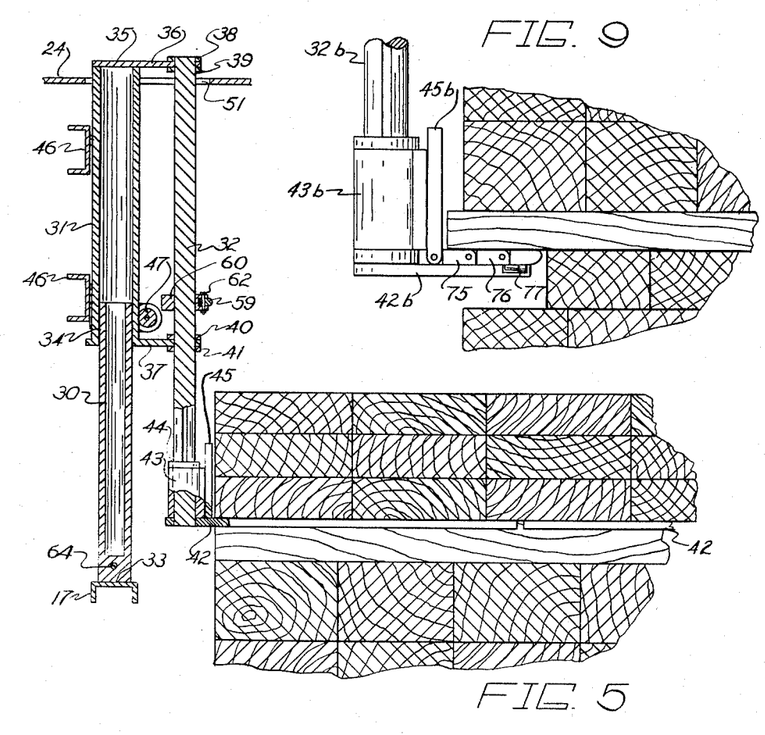
Fig. 5 is a detail sectional view, taken substantially on line 5—5 in Fig. 2, but showing parts of the trailer, including a supporting arm thereof, in different positions and as when said trailer is supporting a load, the view also disclosing a load to be supported.
Fig. 9 is a fragmentary rear elevational view, corresponding generally with the disclosure of Fig 5, of parts of a trailer equipped with supporting means of the character as disclosed in Fig. 8, the view also disclosing, in section, a supported load and a load to be supported.

In Figs. 1, 2, 3 and 5 of the drawings, the supporting arms 42 on the lower ends of the vertical elevating bars 32 are all disclosed as when in position to support a load. In Figs. 1, 3 and 5, said vertical elevating bars and supporting arms are disclosed as when in an elevated position, higher or lower, as the case may be. In Fig. 2, the vertical elevating bars and supporting arms are disclosed as when in their lowermost position. In all of Figs. 1 to 5, the vertical lifting bars 32 are situated interiorly of their corresponding lower and upper cylinders 30 and 31 and so that the corresponding horizontally disposed supporting arms 42 extend transversely of the trailer 15 in perpendicular relation to its longitudinally extending beams 17, 17. There are separate sets, four as shown, of supporting arms 42 each set including two supporting arms in alined relation in direction transversely of said trailer, and the free, interior ends 66, 66 of alined supporting arms are in adjacent relation, as in Figs. 1, 3 and 5, when the supporting arms are in load supporting position. As disclosed, said free, interior ends 66, 66 are of curvilinear configuration.

The supporting arms 42 are adapted to be swung from their alined positions as in the drawings to positions where said supporting arms are substantially in alined relation with the longitudinally extending beams 17, 17, clear of the space between said longitudinally extending beams, in response to actuation of the pistons 55 in one direction, and from their positions where substantially alined with the longitudinally extending beams to their alined positions as disclosed in the drawings in response to actuation of said pistons 55 in opposite direction.

In lumber yards and elsewhere it is common practice to stack materials or articles, such as lumber or concrete, in sections, one upon another. The material handling apparatus herein presented is capable of selectively picking up and/or depositing several sections of stacked materials or articles, or of picking up and/or depositing a single section of materials or articles. The sections of materials or articles to be handled may be stacked as suggested in Fig. 5 with free spaces at the opposite sides of said sections. When a whole stack of sections is to be transported, the trailer 15 will be transported to position where straddling the sections with the supporting arms 42 situated in alinement with the longitudinally extending beams 17, clear of the space between said longitudinally extending beams, and the vertical elevating bars 32 with said supporting arms 42 while in their lowermost position as in Fig. 2, permitted or caused by relief of pressure within the lower and upper cylinders 30 and 31, will be rotated relative to their corresponding lower cylinders, by actuation of the pistons 55 in the manner as hereinbefore set forth, to cause the supporting arms to be moved to position as in Figs. 1, 2, 3 and 5, beneath oppositely disposed portions of the load to be lifted. Thereafter, the vertical elevating bars 32 with supporting arms 42 can be elevated, in response to pressure of fluid applied in the lower and upper cylinders 30 and 31, and transported to a location where to be deposited. Deposit of a load at a desired location can be accomplished by reversal of the operations just described. When one or less than the whole number of sections in a stack is to be picked up and transported, or deposited, the operations as set forth will be carried out, except of course that the vertical elevating bars 32 with supporting arms 42 will be first actuated to the appropriate elevation, above the lowermost position in which the vertical elevating bars and supporting arms are shown in Fig. 2, and then actuated from load free to load pick up position, or from load pick up to load free position as the case may be. In Fig. 5 of the drawings, the vertical elevating bars and supporting arms are disclosed as when situated to pick up an upper section from a lower section of materials or articles, or to deposit the upper section upon the lower section.

The manner in which the upper cylinders 31, together with the vertical elevating bars 32 and the supporting arms 42, are elevated in response to the application of fluid under pressure to the interior spaces of the lower and upper cylinders 30 and 31, as well as the manner in which said upper cylinders and vertical elevating bars and supporting arms become depressed by gravity upon relief of pressure of fluid in said upper and lower cylinders, will be obvious.

With the introduction of fluid pressure into the cylinders 54 at the left of the pistons 55, the actuators 57 will be caused to move to the right as seen in Fig. 4. This will cause the horizontal actuator rods 59 to move in the same direction. Said actuator rods, by reason of their pivotal connections at 62 to the actuator collars 60, will cause the elevating bars 32 to be rotated. The construction and arrangement of parts is such that when the actuator rods 59 have caused the actuating collars and the elevating bars to be rotated through 90 degrees, said actuator rods will ride against the elevating bars and thereby prevent further rotation of said elevating bars. Rotation of the elevating bars 32 is effective to swing the supporting arms 42 from their alined positions as in the drawings to positions where substantially alined with the longitudinally extending beams 17, 17. With movement of the pistons 55 to the right as seen in Fig. 4, after the elevating bars 32 are precluded from further rotation about their own axes, the actuators 57 will cause the actuator rods 59 to be further moved to the right. This movement will cause the actuator collars 60, the elevating bars 32, the ears 36 and 37 and the outer cylinders 31 to revolve as a unit about the inner cylinders 32. This revolution about the inner cylinders causes opposite annular members 43 and guard rails 45 attached thereto to move away from each other. The actuators 57 are jointed at thier midportions, as denoted at 67, to allow the actuator rods 59 to move away from each other and closer to the strengthening beams 46 in response to revolution of the collars 60 with the elevating bars 32 about the inner cylinders 30.

With the introduction of fluid pressure into the cylinders 54 at the right of the pistons 55, the actuators 57 will be caused to move to the left as seen in Fig. 4 and will cause the actuator rods 59 to move in the same direction.

This causes the collars 60, the vertical elevating bars 32, the ears 36 and 37 and the outer cylinders 31 to be revolved bodily about the inner cylinders 30 thus moving the guard rails 45 in direction toward each other. This movement of the actuator rods 59 to the left in Fig. 4 also causes the actuating collars 60 and the elevating rods 32 to be rotated about the axis of said elevating rods to cause the supporting arms 42 to move from positions where alined with beams 17, 17 to positions as shown in the drawings. The construction and arrangement of parts is such that when the ears 36 and 37 and the supporting arms 42 are at right angles to the beams 17, 17, the actuators 57 are at the left limits of their travel.

It is a function of the guard rails, 45, 45 to square-up materials or articles which may be protruding when the supporting arms are actuated from load releasing to load pick up condition, as well as to preclude lower portions of a load from shifting sidewise of the trailer.

Although the vertical elevating bars 32 and supporting arms 42 can be retained by fluid under pressure in the lower and upper cylinders 30 and 31 to support a load, alternative means for retaining said vertical elevating bars and supporting arms in load supporting position can be employed. In Figs. 1 and 3 of the drawings, means for retaining the vertical elevating bars and supporting arms in load supporting position, as when a load is to be transported, is disclosed as shelves 68 situated beneath said supporting arms and removably secured in openings 69 in the side walls 23, 23 of the trailer 15.

Figure 6:
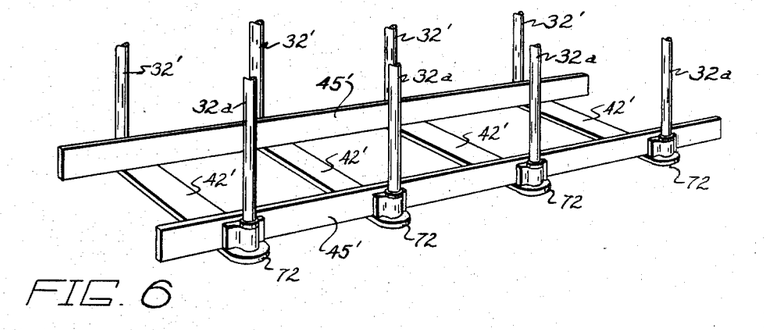
Fig. 6 is a fragmentary perspective view disclosing supporting arms of modified construction which can be employed in a material handling apparatus including features and characteristics of the inveniton, and also disclosing elements with which said supporting arms are assembled.
Figure 7:
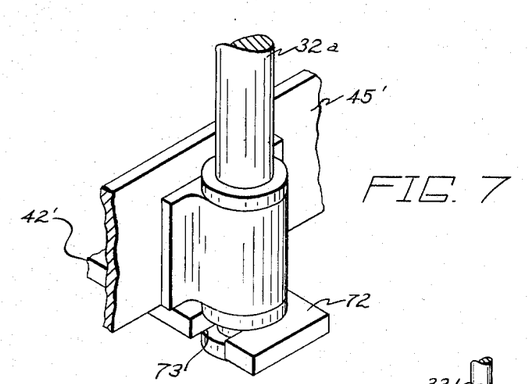
Fig. 7 is an enlarged fragmentary perspective view detailing parts of the disclosure of Fig. 6.

In Figs. 6 and 7, supporting arms 42', equivalent to the supporting arms 42, are disclosed. All of vertical elevating bars 32', equivalent to the vertical elevating bars 32, are at a single side of the trailer. The supporting arms 42' have free end portions 72 and can be assembled with the vertical elevating bars 32' and said vertical elevating bars 32' can be operated in the manner as hereinbefore set forth in connection with the vertical elevating bars 32 and the supporting arms 42. The vertical elevating bars 32$^a$, supported and operated in the same manner as said vertical elevating bars 32 and 32', support bracket elements 73 situated at the lower ends of said vertical elevating bars 32$^a$. Guard rails 45', 45', equivalent to the guard rails 45, 45, are supported upon the vertical elevating bars 32' and 32$^a$ in the same manner as said guard rails 45, 45 are supported upon the vertical elevating bars 32, 32, except that one of the guard rails 45' is above the supporting brackets 73.

The disclosure of Figs. 6 and 7 is to illustrate that all of the supporting arms can be on the vertical elevating bars at a single side of the trailer and extend the full distance across said trailer. When the supporting arms 42' are in load supporting position, their free end portions desirably will be supported upon the bracket elements 73.

In Figs. 8, 9 and 10, 32$^b$ denotes vertical elevating bars equivalent to the vertical elevating bars 32 and similarly operated, and 42$^b$ indicates supporting arms equivalent to the supporting arms 42 and similarly operated. Also in the embodiment of the invention disclosed in said Figs. 8, 9 and 10, annular members 43b and guard rails 45b are equivalent to the annular members 43 and the guard rails 45.

Figure 8:
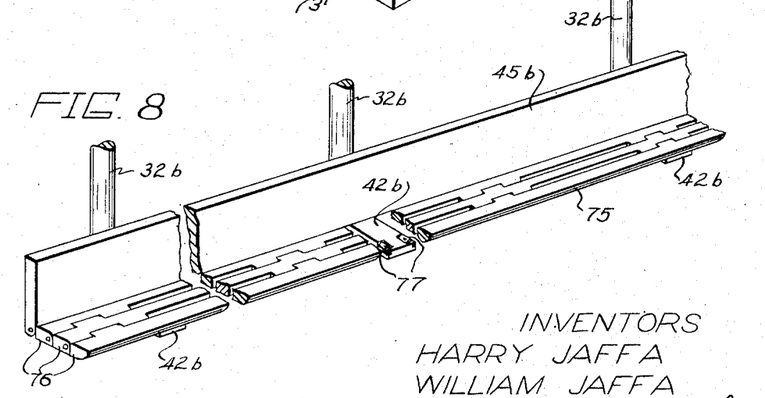
Fig. 8 is a fragmentary perspective view disclosing supporting means of further modified construction adapted to be employed in a material handling apparatus made according to the invention, and also disclosing elements with which said supporting means is assembled.
Figure 10:
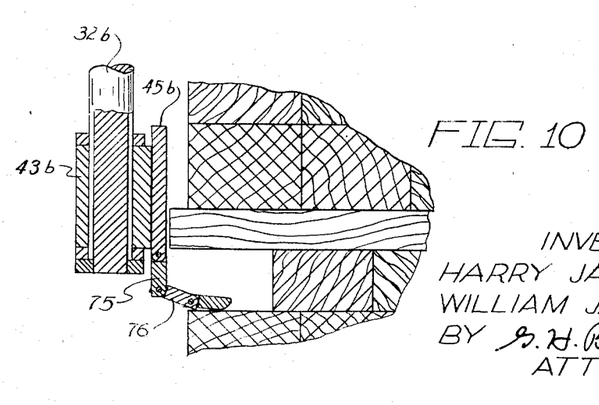
Fig. 10 is a detail sectional view, corresponding generally with the disclosure of Fig. 9, disclosing parts of the supporting means as in said Fig. 9 in different positions.

Each guard rail 45b hingedly supports a longitudinally extending, collapsible ledge 75 secured to the lower edge portion of the guard rail and disposed at the interior side thereof. Each collapsible ledge 75 is constituted as a plurality of hingedly connected strips 76.

The supporting arms 42b are adapted selectively to be swung interiorly to position beneath the collapsible ledges 75 thus to support said collapsible ledges in perpendicular relation to the guard rails 45b, as in Figs. 8 and 9, or to be swung to position exterior and clear of the collapsible ledges thus to permit said collapsible ledges to be released, as in Fig. 10.

The collapsible ledges 75, retained by the supporting arms 42b in perpendicular relation to the guard rails 45b at the interior sides of said guard rails, are adapted to support the load, and to release the load as in Fig. 10 when said supporting arms 42b are removed from beneath said collapsible ledges.

In order that the supporting arms 42b will be readily slidable over the lower surfaces of the connecting strips 76, both when swinging the collapsible ledges upwardly from their released positions and when being removed from beneath said collapsible ledges, said supporting arms 42b are provided with rollers 77 which protrude above outer portions of their upper surfaces.

It will be apparent that when the supporting arms 42b are released from beneath the collapsible ledges 75, the hingedly connected strips of said collapsible ledges will fall by gravity thus to cause the collapsible ledges to be clear of the load. When said supporting arms 42b are actuated from load released to load supporting position of the collapsible ledges 75, the hingedly connected strips 76 of said collapsible ledges will be progressively swung upwardly, the outermost hingedly connected strip first, until all of said connected strips are in a single horizontal plane.

What is claimed is:

1. Material handling apparatus comprising a frame including spaced apart side members and open at its lower portion between said side members, wheels supporting said frame situated clear of its open lower portion, lifting devices upon said frame at the opposite sides thereof, spaced apart guard rails at the opposite sides of said frame carried by said lifting devices and extending longitudinally of the frame, supporting elements carried by lifting devices upon at least one side of said open lower portion, means for actuating said lifting devices to cause said guard rails and said supporting elements selectively to be raised or lowered in unison while the guard rails and the supporting elements, respectively, are maintained in the same horizontal plane with said guard rails above and adjacent to said supporting elements, and means for actuating said lifting devices to cause said guard rails to be moved away from and toward each other and the supporting elements to be moved relative to said frame independently of the position of vertical adjustment of the lifting devices selectively to cause said supporting elements to be moved in unison to position beneath or clear of the open lower portion of said frame and the guard rails to be moved toward each other with movement of the supporting elements to position beneath said open lower portion and away from each other with movement of said supporting elements to position clear of the open lower portion.

2. Material handling apparatus comprising a frame including spaced apart side members and open at its lower portion between said side members, wheels supporting said frame situated at the opposite sides and clear of its open lower portion, lifting devices upon said frame at the opposite sides and clear of its open lower portion, spaced apart guard rails at the opposite sides of said frame carried by and disposed interiorly of said lifting devices and extending longitudinally of the frame, supporting elements carried by lifting devices upon at least one side of said open lower portion, means for actuating said lifting devices to cause said guard rails and said supporting elements selectively to be raised or lowered in unison while the guard rails and the supporting elements, respectively, are maintained in the same horizontal plane with said supporting elements below and adjacent to said guard rails and to be stably situated at any elevation to which adjusted, and means for actuating said lifting devices to cause said guard rails to be moved away from and toward each other and the supporting elements to be moved relative to said frame independently of the position of vertical adjustment of the lifting devices selectively to cause said supporting elements to be moved in unison to position beneath or clear of the open lower portion of said frame and there retained and the guard rails to be moved toward each other with movement of the supporting elements to position beneath said open lower portion and away from each other with movement of said supporting elements to position clear of the open lower portion.

3. Material handling apparatus comprising a frame including spaced apart side members and open at its lower portion between said side members, wheels supporting said frame situated at the opposite sides and clear of its open lower portion, lifting devices upon said frame at the opposite sides and clear of its open lower portion, spaced apart collapsible ledges at the opposite sides of said frame carried by and disposed interiorly of said lifting devices and extending longitudinally of the frame, supporting elements carried by said lifting devices and disposed below and adjacent to said collapsible ledges, means for actuating said lifting devices to cause said collapsible ledges and said supporting elements selectively to be raised or lowered in unison while the collapsible ledges and the supporting elements, respectively, are maintained in the same horizontal plane and to be stably situated at any elevation to which adjusted, and means for actuating said lifting devices to cause said supporting elements to be moved relative to said frame independently of the position of vertical adjustment of the lifting devices selectively to cause the supporting elements to be moved in unison to position beneath or clear of the open lower portion of said frame and there retained and the collapsible ledges to be moved to horizontal position beneath said open lower portion in response to movement of said supporting elements to position beneath the open lower portion and released for movement toward vertical position clear of said open lower portion with movement of the supporting elements to position clear of the open lower portion.

4. Material handling apparatus comprising a frame including spaced apart side members and open at its lower portion between said side members, wheels supporting said frame situated at the opposite sides and clear of its open lower portion, lifting devices upon said frame at the opposite sides and clear of its open lower portion, spaced apart guard rails at the opposite sides of said frame carried by and disposed interiorly of said lifting devices and extending longitudinally of the frame, collapsible ledges carried by and disposed interiorly of lower portions of said guard rails, supporting elements carried by said lifting devices and disposed below and adjacent to said collapsible ledges, means for actuating said lifting devices to cause said guard rails, said collapsible ledges and said supporting elements selectively to be raised or lowered in unison while the guard rails, the collapsible ledges and the supporting elements, respectively, are maintained in the same horizontal plane and to be stably situated at any elevation to which adjusted, and means for actuating said lifting devices to cause said guard rails to be moved away from and toward each other and the supporting elements to be moved relative to said frame independently of the position of vertical adjustment of the lifting devices selectively to cause the supporting elements to be moved in unison to position beneath or clear of the open lower portion of said frame and there retained, the guard rails to be moved toward each other with movement of the supporting elements to position beneath said open lower portion and away from each other with movement of said supporting elements to position clear of the open lower portion, and the collapsible ledges to be moved to horizontal position beneath said open lower portion in response to movement of said supporting elements to position beneath the open lower portion and released for movement toward vertical position clear of said open lower portion with movement of the supporting elements to position clear of the open lower portion.

5. In material handling apparatus, a vertically disposed lower cylinder, a support for said lower cylinder, a vertically disposed upper cylinder telescoped with said lower cylinder for longitudinal and rotative movement, a vertical elevating bar rigid with said upper cylinder disposed at a side of the lower and upper cylinders, a supporting element rigid with said vertical elevating bar, an actuator element in which said vertical elevating bar is mounted for longitudinal movement and fixed against rotative movement, means for forcibly moving said upper cylinder in direction away from said lower cylinder, and means for operating said actuator element to cause said upper cylinder to be rotatively moved relative to said lower cylinder.

6. In material handling apparatus, a vertically disposed lower cylinder, a support for said lower cylinder, a vertically disposed upper cylinder telescoped with said lower cylinder for longitudinal and rotative movement, a vertical elevating bar rigid with said upper cylinder disposed at a side of the lower and upper cylinders, a supporting element rigid with said vertical elevating bar, an actuator element in which said vertical elevating bar is mounted for longitudinal movement and fixed against rotative movement, hydraulically actuated means for forcibly moving said upper cylinder in direction away from said lower cylinder adapted to be operated to release the upper cylinder to be moved by gravity toward the lower cylinder, and hydraulically actuated means for operating said actuator element to cause said upper cylinder to be rotatively moved relative to said lower cylinder selectively in opposite directions.

7. In material handling apparatus, spaced apart, vertically disposed lower cylinders, a support for said lower cylinders, a vertically disposed upper cylinder telescoped with each of said lower cylinders for longitudinal and rotative movement, a vertical elevating bar rigid with each of said upper cylinders disposed at a side of the corresponding lower and upper cylinders, a supporting element rigid with each of said vertical elevating bars, an actuator rod, actuator elements secured to said actuator rod and in which said vertical elevating bars are mounted for longitudinal movement and fixed against rotative movement, means for forcibly moving said upper cylinders in direction away from said lower cylinders, and means for imparting longitudinal movement to said actuator rod to cause each of said upper cylinders to be rotatively moved relative to its corresponding lower cylinder.

8. In material handling apparatus, spaced apart, vertically disposed lower cylinders, a support for said lower cylinders, a vertically disposed upper cylinder telescoped with each of said lower cylinders for longitudinal and rotative movement, a vertical elevating bar rigid with each of said upper cylinders disposed at a side of the corresponding lower and upper cylinders, a supporting element rigid with each of said vertical elevating bars, an actuator rod, actuator elements secured to said actuator rod and in which said vertical elevating bars are mounted for longitudinal movement and fixed against rotative movement, hydraulically actuated means for forcibly moving said upper cylinders in direction away from said lower cylinders adapted to be operated to release the upper cylinders to be moved by gravity toward the lower cylinders, and hydraulically actuated means for imparting longitudinal movement to said actuator rod to cause each of said upper cylinders to be rotatively moved relative to its corresponding lower cylinder selectively in opposite directions.

9. The combination as specified in claim 7, and a guard rail situated adjacent to said supporting elements and supported upon said vertical elevating bars for rotative movement of the vertical elevating bars relative to said guard rail.

10. The combination as specified in claim 8, and a guard rail situated adjacent to said supporting elements at the side of said vertical elevating bars opposite said lower and upper cylinders and supported upon the vertical elevating bars for rotative movement of said vertical eleating bars relative to said guard rail.

11. In material handling apparatus, spaced apart, vertically disposed lower cylinders, a support for said lower cylinders, a vertically disposed upper cylinder telescoped with each of said lower cylinders for longitudinal movement, supporting elements mounted to move with said upper cylinders in vertical direction and to swing on a pivot in a horizontal plane, means for forcibly moving said upper cylinders in direction away from said lower cylinders, and means for swinging said supporting elements to and from a load engaging and a load clear position.

12. In material handling apparatus, spaced apart, vertically disposed lower cylinders, a support for said lower cylinders, a vertically disposed upper cylinder telescoped with each of said lower cylinders for longitudinal movement, a vertical elevating bar rotatably mounted on each of said upper cylinders disposed at a side of the corresponding lower and upper cylinders, a supporting element rigid with each of said elevating bars, an actuator rod, actuating elements secured to said actuator rod and in which said vertical elevating bars are mounted for longitudinal movement and fixed against rotative movement, means for forcibly moving said upper cylinders in direction away from said lower cylinders, and means for imparting longitudinal movement to said actuator rod to cause each of said supporting elements to be revolved about its corresponding vertical elevating bar.

13. In material handling apparatus, spaced apart vertically disposed lower cylinders, a support for said lower cylinders, a vertically disposed upper cylinder telescoped with each of said lower cylinders for longitudinal movement, a vertical elevating bar rotatably mounted on each of said upper cylinders disposed at a side of the corresponding lower and upper cylinders, a supporting element rigid with each of said elevating bars, an actuator rod, actuating elements secured to said actuator rod and in which said vertical elevating bars are mounted for longitudinal movement and fixed against rotative movement, first hydraulically actuated means for forcibly moving said upper cylinders in direction away from said lower cylinders adapted to be operated to release the upper cylinders for movement by gravity toward the lower cylinders, and second hydraulically actuated means for imparting longitudinal movement to said actuator rod to cause each of said supporting elements to be revolved about its corresponding vertical elevating bar.

14. The combination as specified in claim 12, and a guard rail situated adjacent to said supporting elements and supported upon said vertical elevating bars for rotative movement of the vertical elevating bars relative to said guard rail.

15. The combination as specified in claim 13, and a guard rail situated adjacent to said supporting elements at the side of said vertical elevating bars opposite said lower and upper cylinders and supported upon the vertical elevating bars for rotative movement of said vertical elevating bars relative to said guard rail.

16. Material handling apparatus comprising a frame including spaced apart side members and open at its lower portion between said side members, wheels supporting said frame situated clear of its open lower portion, lifting devices upon said frame at opposite sides thereof, supporting elements mounted on said lifting devices on at least one side of said lower portion for pivotal movement in a horizontal plane, means for actuating said lifting devices to cause said supporting elements selectively to be raised and lowered, and means for actuating said lifting devices to cause said supporting elements selectively to be pivoted to position beneath and clear of the open lower portion of said frame.

17. Material handling apparatus comprising a frame including spaced apart side members and open at its lower portion between said side members, wheels supporting said frame situated clear of its open lower portion, lifting devices upon said frame at opposite sides thereof, supporting elements mounted on said lifting devices on at least one side of said lower portion for pivotal movement in a horizontal plane, means for actuating said lifting devices to cause said supporting elements selectively to be raised and lowered in unison while being maintained in the same horizontal plane, and means for actuating said lifting devices to cause said supporting elements selectively to be pivoted to position beneath and clear of the open lower portion of said frame.

18. Material handling apparatus comprising a frame including spaced apart side members and open at its lower portion between said side members, wheels supporting said frame situated clear of its open lower portion, lifting devices upon said frame at opposite sides thereof, spaced apart guard rails at opposite sides of said frame carried by said lifting devices and extending longitudinally of the frame, supporting elements mounted on said lifting devices on at least one side of said open lower portion for pivotal movement in a horizontal plane, means for actuating said lifting devices to cause said guard rails and said supporting elements selectively to be raised and lowered in unison while the guard rails and supporting elements, respectively, are maintained in the same horizontal plane with said guard rails above and adjacent to said supporting elements, and means for actuating said lifting devices to cause said supporting elements selectively to be pivoted to position beneath and clear of the open lower portion of said frame.

HARRY JAFFA.
WILLIAM JAFFA.

REFERENCES CITED

The following references are of record in the file of this patent:

UNITED STATES PATENTS

| Number | Name | Date |
| --- | --- | --- |
| 1,429,974 | Rogers | Sept. 26, 1922 |
| 1,488,267 | Meyers | Mar. 25, 1924 |
| 1,609,018 | Gerlinger | Nov. 30, 1926 |
| 2,201,189 | Makaroff et al. | May 21, 1940 |
| 2,259,558 | Evans | Oct. 21, 1941 |
| 2,369,838 | Minnis | Feb. 20, 1945 |
| 2,404,898 | Aycock | July 30, 1946 |
| 2,410,965 | Dimick | Nov. 12, 1946 |